(12) United States Patent (10) Patent No.: US 12,560,278 B2

Evans (45) Date of Patent: Feb. 24, 2026

(54) TORSION SPRING BRACING SYSTEM AND METHOD FOR INSTALLATION THEREOF

(71) Applicant: Rob J Evans, Glendale, AZ (US)

(72) Inventor: Rob J Evans, Glendale, AZ (US)

( * ) Notice: Subject to any disclaimer, the term of this patent is extended or adjusted under 35 U.S.C. 154(b) by 15 days.

(21) Appl. No.: 18/674,140

(22) Filed: May 24, 2024

(65) Prior Publication Data

US 2025/0361977 A1 Nov. 27, 2025

(51) Int. Cl.
*F16M 13/02* (2006.01)
*F16F 1/12* (2006.01)

(52) U.S. Cl.
CPC ............... *F16M 13/02* (2013.01); *F16F 1/12* (2013.01); *F16F 2226/04* (2013.01); *F16F 2230/0005* (2013.01)

(58) Field of Classification Search
CPC ........ F16M 13/02; F16F 1/12; F16F 2226/04; F16F 2230/0005; E05D 13/1207; E05D 13/1261; E05D 13/1284; E05D 13/1292
USPC .................................. 248/247, 248, 300, 301
See application file for complete search history.

(56) References Cited

U.S. PATENT DOCUMENTS

| | | | | |
|---|---|---|---|---|
| 2,980,404 | A * | 4/1961 | Andersen ................ | F28D 7/024 165/172 |
| 3,412,423 | A * | 11/1968 | Binns ................. | E05D 13/1261 49/200 |
| 4,882,806 | A * | 11/1989 | Davis .................. | E05D 13/1261 16/198 |
| 4,930,182 | A * | 6/1990 | Eichenberger ...... | E05D 13/1261 242/378 |
| 5,240,216 | A * | 8/1993 | Lin ......................... | E05D 15/38 248/300 |
| 5,419,010 | A * | 5/1995 | Mullet ................ | E05D 13/1261 160/191 |
| 6,349,911 | B1 * | 2/2002 | Feldpausch ............ | A47B 57/34 248/250 |
| 6,408,925 | B1 * | 6/2002 | Dorma ................ | E05D 13/1261 49/200 |
| 6,463,961 | B1 * | 10/2002 | Iizuka ................. | F24F 13/0254 138/155 |
| 6,527,037 | B2 * | 3/2003 | Daus ......................... | E06B 9/60 160/133 |
| 6,662,499 | B1 * | 12/2003 | Shin ....................... | F16M 11/10 49/197 |
| 6,896,027 | B2 * | 5/2005 | Crouch ..................... | E06B 9/60 160/315 |

(Continued)

*Primary Examiner* — Eret C Mcnichols

(74) *Attorney, Agent, or Firm* — Morgan Law Offices, PLC

(57) ABSTRACT

A torsion spring bracing system is provided. The torsion spring bracing system includes a first brace. The first brace includes a base plate having a substantially straight bottom edge, substantially straight left-side and right-side edges each substantially perpendicular to the bottom edge, a top edge having a left-side bend and a right-side bend, and a pair of prongs extending from the top edge including a left-side prong and a right-side prong. The torsion spring bracing system further may include a second brace adapted to be attached to a center bearing plate, the center bearing plate accommodating a shaft driven by at least one torsion spring. The second brace is adapted to be attachable to the first brace. According to another aspect of the disclosure, a method for installing the bracing is provided.

8 Claims, 6 Drawing Sheets

(56) References Cited

U.S. PATENT DOCUMENTS

| | | | | |
|---|---|---|---|---|
| 7,254,868 B2 * | 8/2007 | Mullet | E05D 13/003 | 160/191 |
| 7,428,918 B2 * | 9/2008 | Martin | E05D 13/1269 | 160/302 |
| 7,686,061 B2 * | 3/2010 | Mullet | E05D 15/24 | 160/192 |
| 8,042,777 B2 * | 10/2011 | Ruiz | H02G 3/086 | 248/300 |
| 8,931,216 B2 * | 1/2015 | Gazda | E05D 15/0656 | 52/64 |
| 9,080,361 B2 * | 7/2015 | Nykilchuk | E05D 13/1261 | |
| 9,273,504 B2 * | 3/2016 | Schutt | E05D 15/24 | |
| 9,296,280 B2 * | 3/2016 | Ehrlich | B60J 5/14 | |
| 10,513,875 B2 * | 12/2019 | Balay | E05D 13/1261 | |
| 10,829,970 B2 * | 11/2020 | Ehrlich | E05B 65/0021 | |
| 11,306,793 B2 * | 4/2022 | Schutt | F16F 1/121 | |
| 11,859,423 B2 * | 1/2024 | Wait | E05D 13/1253 | |
| 12,181,172 B2 * | 12/2024 | Gorad | F24F 1/46 | |
| 2003/0201077 A1 * | 10/2003 | Mullet | E05D 15/24 | 160/192 |
| 2014/0041305 A1 * | 2/2014 | Gazda | E05D 15/0656 | 49/360 |
| 2015/0020456 A1 * | 1/2015 | Nykilchuk | E05D 13/00 | 49/506 |

* cited by examiner

TORSION SPRING BRACING SYSTEM AND METHOD FOR INSTALLATION THEREOF

TECHNICAL FIELD

The present disclosure relates generally to residential overhead garage doors, and more particularly to a torsion spring bracing system and method for installation thereof.

BACKGROUND

Most residential overhead garage doors utilize one or more torsion springs. The torsion springs are wound by the force of gravity when the door closes and are under constant tension while the door is closed. The energy stored in the wound torsion springs does most of the work to lift the door when the door is opening. The torsion springs drive a horizontal shaft which attaches on left and right sides to respective cable drums. The cable drums are essentially pulleys which employ cables attached to the door to actually lift the door.

A typical residential garage door is about 7 to 8 feet tall and 9 to 16 feet wide and weighs 150 pounds or more. The torsion springs are wound to a torsion sufficient to supply an upward force equal to the weight of the door. Thus, for example, a 200-pound door would require that each spring be wound to supply 100 pounds of force when fully loaded. When installed, the torsion springs must be securely mounted.

Referring to FIG. 1, conventionally, an anchor pad 120, typically a 6"×2" piece of wood, sits on a horizontal portion of the frame 140 of the garage above the garage door opening 160. A center bearing plate is mounted to the anchor pad 120 between the torsion springs. The torsion shaft passes through a bearing in the center bearing plate. Although the foregoing arrangement is generally sufficient, occasionally, the center bearing plate and torsion springs break free from the anchor pad 120 due to the force of the torsion springs over time causing degradation to the mounting structure leading to a catastrophic failure.

SUMMARY

A torsion spring bracing system is provided. The torsion spring bracing system includes a first brace. The first brace includes a base plate having a substantially straight bottom edge, substantially straight left-side and right-side edges each substantially perpendicular to the bottom edge, a top edge having a left-side bend and a right-side bend, and a pair of prongs extending from the top edge including a left-side prong and a right-side prong. The torsion spring bracing system further may include a second brace adapted to be attached to a center bearing plate, the center bearing plate accommodating a shaft driven by at least one torsion spring. The second brace is adapted to be attachable to the first brace.

According to an aspect of the disclosure, the base plate includes a plurality of base plate through holes for securing the base plate to a frame of a garage.

According to an aspect of the disclosure, the base plate includes a plurality of through holes in each of the left-side prong and the right-side prong for securing the left-side prong and the right-side prong to an anchor pad.

According to an aspect of the disclosure, the plurality of holes in each of the left-side prong and the right-side prong include first prong holes and second prong holes. The first prong holes and the second prong holes may be circular, and the first prong holes have larger diameters than the second prong holes.

According to an aspect of the disclosure, the second brace has a plurality of through holes for securing the secondary brace to a center bearing plate.

According to another aspect of the disclosure, a method for installing the bracing including the first brace and the second brace is provided.

s

Figure 6:
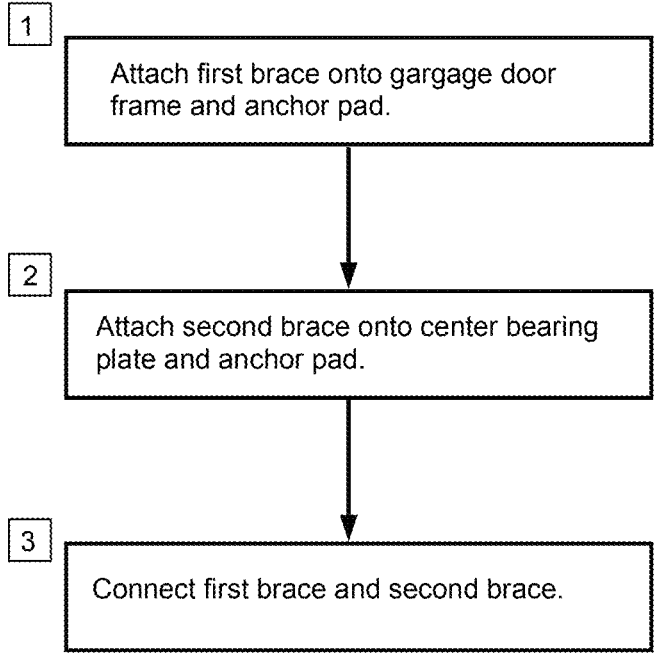

FIG. 6 shows a method of installing the torsion spring bracing, according to an example embodiment of the disclosure.

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout.

Figure 1:
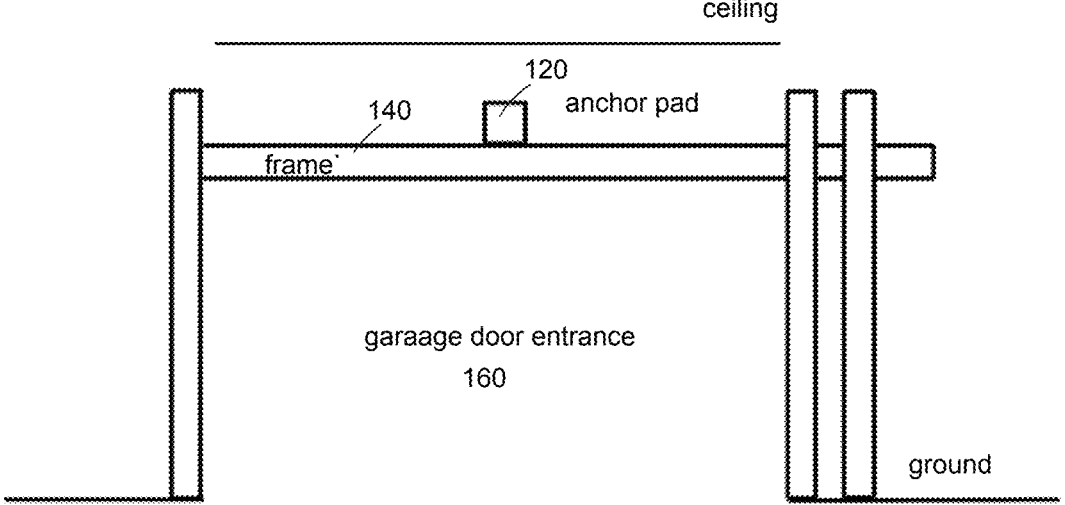
FIG. 1 shows features of a conventional residential overhead door installation.
Figure 2A:
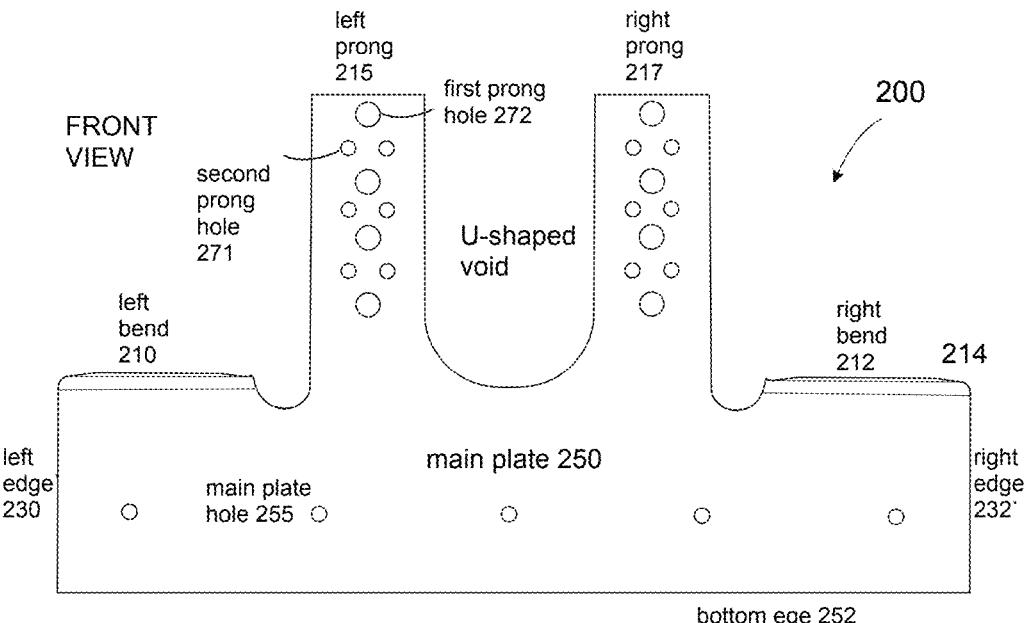
FIG. 2A shows a front view of a first brace, according to an example embodiment of the disclosure.
Figure 2B:
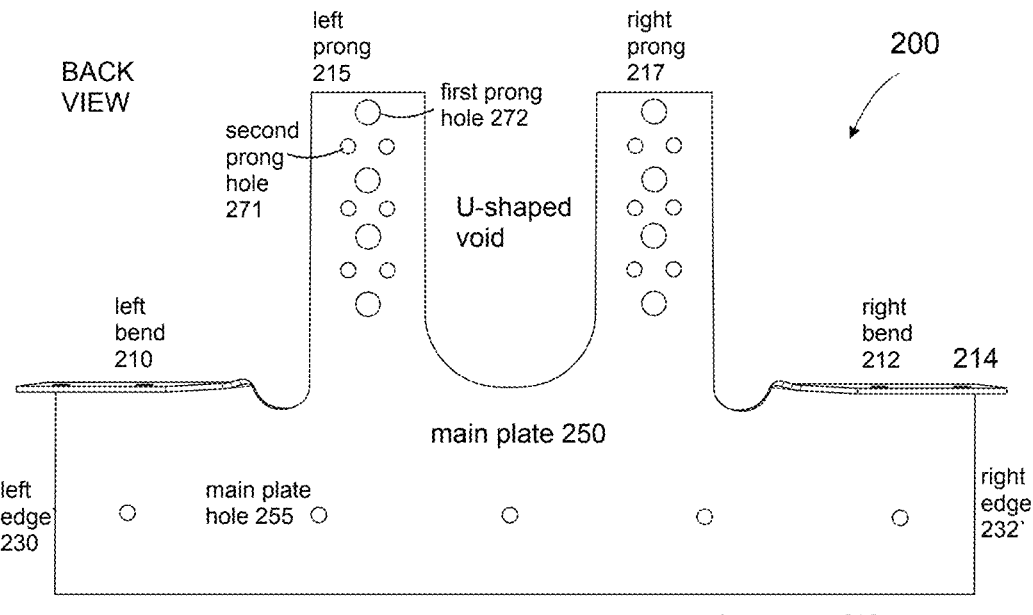
FIG. 2B shows a back view of the first brace of FIG. 2A, according to an example embodiment of the disclosure.

Referring to FIG. 2A, a front view of a first brace 200, according to an example embodiment of the disclosure, is illustrated. FIG. 2B illustrates a back view the first brace 200. The first brace 200 includes a base plate 250 having a substantially straight bottom edge 252, substantially straight left-side and right-side edges 230 and 232, respectively, each substantially perpendicular to the bottom edge 252. As shown, the base plate 250 includes a top edge 214 having a left-side bend 210 and a right-side bend 212. The left-side bend 210 and the right-side bend 212 are each bent outwardly at about 90 degrees. Additionally, a pair of prongs extend from the top edge 214 including a left-side prong 215 and a right-side prong 217, as shown. The first brace 200 is preferably fabricated from a single piece of sheet metal though other methods of manufacture may suffice.

Figure 4:
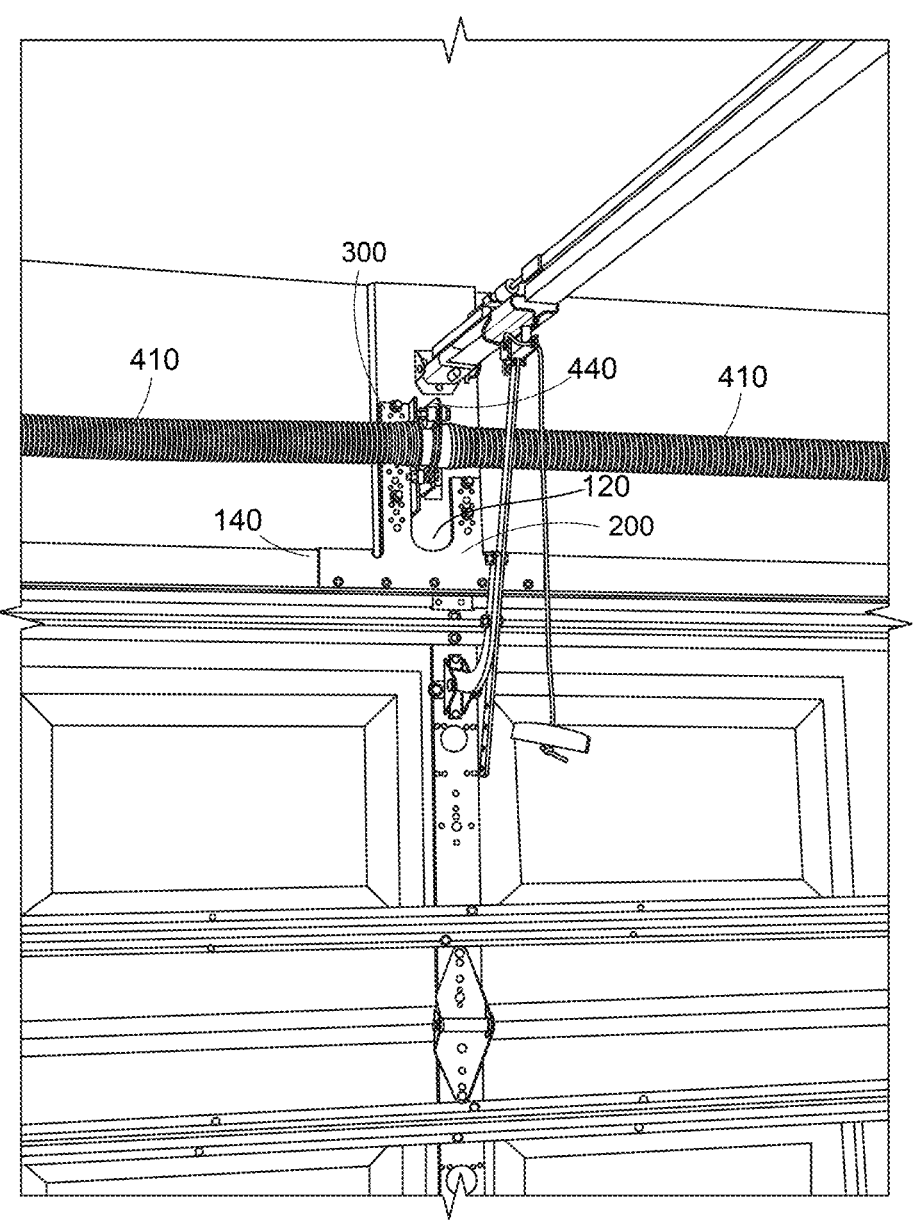
FIG. 4 shows the torsion spring bracing system installed, according to an example embodiment of the disclosure.

The first brace 200 further includes a plurality of through holes that permit the first brace 200 to be fastened to a portion of the garage frame 140 and the anchor pad 120 (as shown in FIG. 4). In particular, the main plate 250 includes several main plate holes 255 that allow fasteners (e.g., bolts, screws) to be used to secure the main plate 250 to the frame 140 such that the left-side bend 210 and the right-side bend 212 rest on a top side of a wood plank of the frame 140. The left-side prong 215 and a right-side prong 217 include through holes that allow fasteners (e.g., bolts, screws) to be used to secure the prongs to the anchor pad 120. In an embodiment, the left-side prong 215 and a right-side prong 217 include a plurality of circular first prong holes 272 and second prong holes 271, the first prong holes 272 each having a greater diameter than the second prong holes 271, as shown.

Figures 3A, 3B:
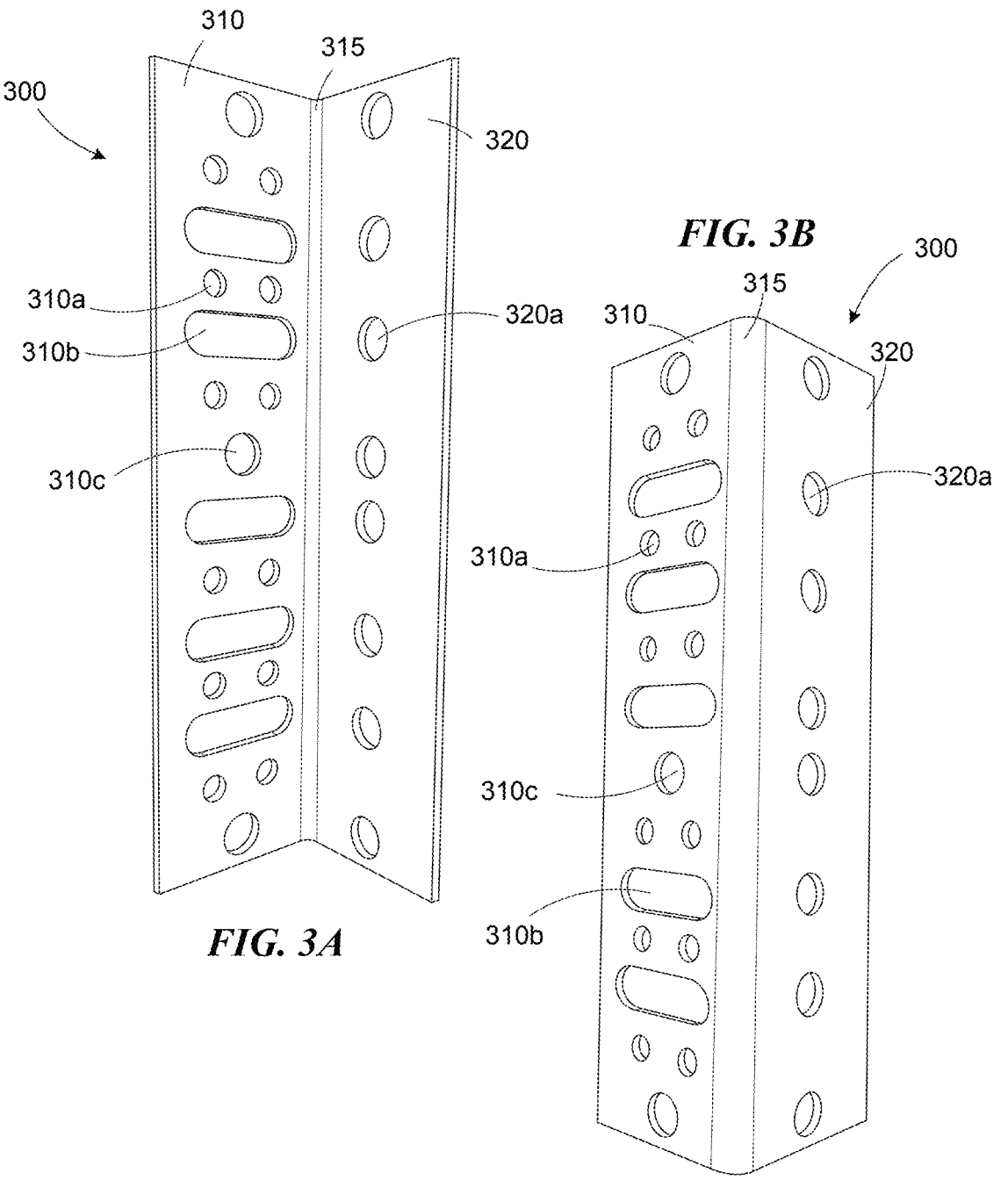
FIGS. 3A-B show various views of a second brace, according to an example embodiment of the disclosure.

Referring to FIGS. 3A-B, views of a second brace 300, according to an example embodiment of the disclosure, are illustrated. The second brace 300 includes a first side 310, a second side 320, and a corner 315 between the first side 310 and the second side 320. In an embodiment, the first side 310 and the second side 320 have the same proportions (i.e., width, length, and thickness) and are formed from the same metal sheet. The metal sheet is bent at about a 90-degree angle at the corner 315. The first side 310 has a plurality of through holes 310a, 310b, and 310c, which may be of different sizes and shapes to accommodate fastening the second brace 300 to various types of structures. Some of the holes, such as holes 310b, may be oblong. Additionally, the second side 320 includes a plurality of through holes 320 that allow fasteners (e.g., bolts, screws) to be used to secure the second brace 300 to a center bearing plate (as shown most clearly in FIG. 5), the center bearing plate accommodating a shaft driven by at least one torsion spring.

Figure 5:
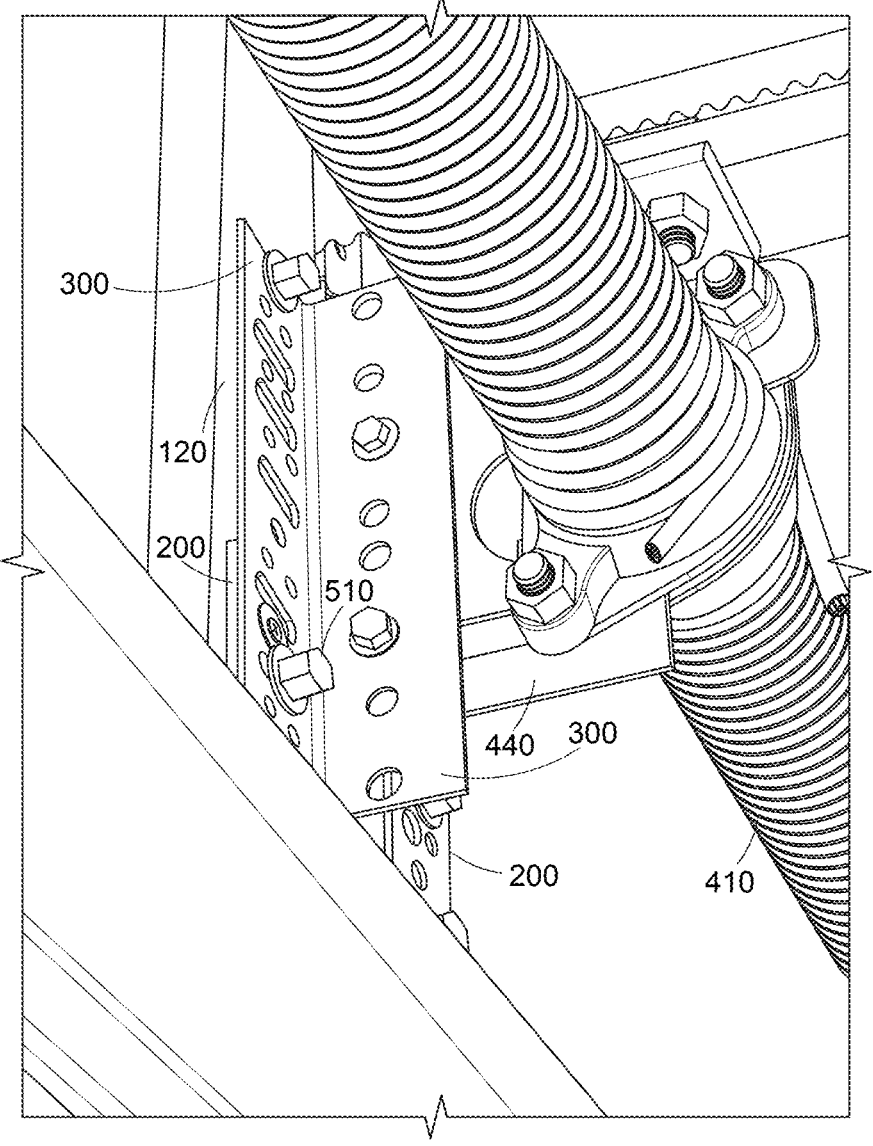
FIG. 5 shows a close-up view of the second brace installed, according to an example embodiment of the disclosure.

Referring to FIG. 4, the torsion spring bracing system including the first brace 200 and the second brace 300 is shown installed, according to an example embodiment of the disclosure. FIG. 5 shows a close-up view of the second brace installed. As shown, a pair of torsion springs 410 are mounted using center bearing plate 440 which is secured to anchor pad 120. The first brace 200 is fastened to the frame 130 and the anchor pad. The second side 320 of the second brace 300 is secured to the center bearing plate 440 and the first side 310 of the second brace 300 is secured to the anchor pad 120. Additionally, the first brace 200 and the second brace 300 are connected to overlapping portions of each other via bolt 510, as shown.

Referring to FIG. 6, a method of installing the torsion spring bracing, according to an example embodiment of the disclosure, is illustrated.

In step 1, the first brace 200 is attached onto the garage door frame 140 and the anchor pad 120. This can be done by positioning the base plate 250 along the side of a framing plank with the left-side bend 210 and the right-side bend 212 resting on a top side of the framing plank. The left-side prong 215 and the right-side prong 217 will be disposed on respective left and right sides of the center bearing plate 440. The base plate is secured by driving fasteners through the main plate holes 255 and the prong holes 215, 217.

In step 2, the second brace 300 is attached to the anchor pad 120 and the center bearing plate 440. The second side 320 of the second brace 300 is secured to the center bearing plate 440 and the first side 310 of the second brace 300 is secured to the anchor pad 120.

In step 3, the first brace 200 and the second brace 300 are connected. For example, a bolt, such as the bolt 510, can be used to connect overlapping portions of the first brace 200 and the second brace 300.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A torsion spring bracing system, comprising:
a first brace having a base plate including
  a substantially straight bottom edge;
  substantially straight left-side and right-side edges each substantially
  perpendicular to the bottom edge;
  a top edge having a left-side bend and a right-side bend; and
  a pair of prongs extending from the top edge including
    a left-side prong and a right-side prong;
  wherein the base plate includes a plurality of through holes in each of the left-side prong and the right-side prong for securing the left-side prong and the right-side prong to an anchor pad.

2. The torsion spring bracing system of claim 1, further including a second brace adapted to be attached to a center bearing plate, the center bearing plate accommodating a shaft driven by at least one torsion spring.

3. The torsion spring bracing system of claim 2, wherein the second brace is adapted to be attachable to the first brace.

4. The torsion spring bracing system of claim 2, wherein the second brace has a plurality of through holes for securing the second brace to a center bearing plate.

5. The torsion spring bracing system of claim 1, wherein the base plate includes a plurality of base plate through holes for securing the base plate to a frame of a garage.

6. A method of installing torsion spring bracing, comprising:
providing a first brace having a base plate including
  a substantially straight bottom edge;
  substantially straight left-side and right-side edges each substantially perpendicular to the bottom edge;
  a top edge having a left-side bend and a right-side bend; and
a pair of prongs extending from the top edge including a left-side prong and a right-side prong;
  attaching the base plate onto a lateral side of a frame of a garage wherein the first bend and the second bend cover at least part of a top side of the frame; and
  attaching the left-side prong and the right-side prong to an anchor pad wherein a center bearing plate is situated between the right-side prong and the left-side prong.

7. The method of installing torsion spring bracing of claim 6, further comprising:
providing a second brace; and
attaching the second brace to a center bearing plate of an overhead door, the center bearing plate accommodating a shaft driven by at least one torsion spring.

8. The method of installing torsion spring bracing of claim 7, further comprising:
attaching the second brace to the first brace.

* * * * *